(12) United States Patent
Sano

(10) Patent No.: US 10,784,811 B2
(45) Date of Patent: Sep. 22, 2020

(54) POWER CONVERSION DEVICE CONTROL SYSTEM, MOTOR SYSTEM AND COMPOSITE SYSTEM

(71) Applicant: HONDA MOTOR CO., LTD., Minato-ku, Tokyo (JP)

(72) Inventor: Tomoyuki Sano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/354,346

(22) Filed: Mar. 15, 2019

(65) Prior Publication Data

US 2019/0296681 A1 Sep. 26, 2019

(30) Foreign Application Priority Data

Mar. 23, 2018 (JP) ................... 2018-056973

(51) Int. Cl.

| H02P 6/14 | (2016.01) |
|---|---|
| H02P 29/66 | (2016.01) |
| H02P 6/17 | (2016.01) |
| H02M 7/5387 | (2007.01) |
| H02P 25/03 | (2016.01) |
| B60L 50/14 | (2019.01) |
| B60W 20/00 | (2016.01) |

(52) U.S. Cl.
CPC ............ *H02P 29/662* (2016.11); *B60L 50/14* (2019.02); *B60W 20/00* (2013.01); *H02M 7/53871* (2013.01); *H02P 6/17* (2016.02); *H02P 25/03* (2016.02); *B60L 2240/12* (2013.01); *B60L 2240/425* (2013.01); *B60L 2240/441* (2013.01); *B60L 2240/526* (2013.01); *B60Y 2200/92* (2013.01)

(58) Field of Classification Search
CPC .. H02P 29/032; H02P 29/64; H02M 2001/327
See application file for complete search history.

(56) References Cited

U.S. PATENT DOCUMENTS

| 2011/0029179 A1* | 2/2011 | Miyazaki | ................. B60K 6/46 701/22 |
| 2011/0210713 A1* | 9/2011 | Kazama | .............. H02M 3/1588 323/311 |

FOREIGN PATENT DOCUMENTS

JP 2010-213485 9/2010

\* cited by examiner

*Primary Examiner* — Karen Masih
(74) *Attorney, Agent, or Firm* — Amin, Turocy & Watson LLP

(57) ABSTRACT

A power conversion device control system includes a power conversion device configured to supply electric power to a rotary electric machine, and a control device configured to control the power conversion device, wherein the control device controls the power conversion device through synchronous control in which a carrier frequency of the power conversion device is proportional to a rotational speed of the rotary electric machine when a temperature of a permanent magnet provided in the rotary electric machine is higher than a predetermined threshold value, and controls the power conversion device through non-synchronous control in which a carrier frequency of the power conversion device is not proportional to a rotational speed of the rotary electric machine when a temperature of the permanent magnet is the predetermined threshold value or less.

6 Claims, 8 Drawing Sheets

POWER CONVERSION DEVICE CONTROL SYSTEM, MOTOR SYSTEM AND COMPOSITE SYSTEM

CROSS-REFERENCE TO RELATED APPLICATION

Priority is claimed on Japanese Patent Application No. 2018-056973, filed Mar. 23, 2018, the content of which is incorporated herein by reference.

BACKGROUND OF THE INVENTION

Field of the Invention

The present invention relates to a power conversion device control system, a motor system and a composite system.

Description of Related Art

In the related art, a rotary electric machine control system configured to suppress increase in temperature of a rotary electric machine during synchronous pulse width modulation (PWM) control (for example, see Japanese Unexamined Patent Application, First Publication No. 2010-213485) is known. The rotary electric machine control system is configured to include a rotary electric machine, a control block for synchronous PWM control, an inverter, a control part, and a storage part. A set synchronized pulse number that is a periodical pulse number of a carrier with respect to one period of a voltage command value is stored in set synchronized pulse number data of the storage unit, a relationship between a carrier phase and a temperature of the rotary electric machine when operating at a carrier phase is previously obtained, and on the basis of that relationship, an optimal carrier phase at which a temperature of the rotary electric machine becomes to an optimal condition for respective set synchronized pulse numbers is stored in optimal carrier phase data. The control part sets a phase of the carrier of the inverter to an optimal carrier phase according to operating conditions of the rotary electric machine.

SUMMARY OF THE INVENTION

In the above-mentioned rotary electric machine control system, current stability is improved and a temperature of a magnet is reduced by applying synchronous PWM control.

Incidentally, in the above-mentioned rotary electric machine control system, switching of a carrier frequency (a carrier phase), which may cause noise and vibration, may occur in many cases. For this reason, in the above-mentioned rotary electric machine control system, marketability may be decreased.

The present invention provides a power conversion device control system, a motor system and a composite system, which are capable of suppressing increase in temperature of a permanent magnet of a rotary electric machine while suppressing noise and vibration according to switching of a carrier frequency.

(1) A power conversion device control system according to an aspect of the present invention includes a power conversion device configured to supply electric power to a rotary electric machine; and a control device configured to control the power conversion device, wherein the control device controls the power conversion device through synchronous control in which a carrier frequency of the power conversion device is proportional to a rotational speed of the rotary electric machine when a temperature of a permanent magnet provided in the rotary electric machine is higher than a predetermined threshold value, and controls the power conversion device through non-synchronous control in which a carrier frequency of the power conversion device is not proportional to a rotational speed of the rotary electric machine when a temperature of the permanent magnet is the predetermined threshold value or less.

(2) A motor system according to an aspect of the present invention includes the power conversion device control system according to the aspect (1), a traveling/driving motor serving as the rotary electric machine, and a generating motor, wherein the control device may control the power conversion device configured to supply electric power to the traveling/driving motor through the synchronous control and the non-synchronous control.

(3) A composite system according to an aspect of the present invention includes the power conversion device control system and the rotary electric machine according to the aspect (1), and an internal combustion engine, wherein, when the internal combustion engine is operating and even when a temperature of the permanent magnet is the predetermined threshold value or less, the control device may allow control of the power conversion device through the synchronous control.

(4) A composite system according to an aspect of the present invention includes the power conversion device control system and the rotary electric machine according to the aspect (1), and an internal combustion engine, wherein, when a rotational speed of the internal combustion engine is a predetermined rotational speed or more and even when a temperature of the permanent magnet is the predetermined threshold value or less, the control device may allow control of the power conversion device through the synchronous control.

(5) The power conversion device control system according to the aspect (1) may be mounted on a vehicle, the rotary electric machine may be used for driving and traveling of the vehicle, and when a traveling speed of the vehicle is a predetermined speed or more and even when a temperature of the permanent magnet is the predetermined threshold value or less, the control device may allow control of the power conversion device through the synchronous control.

In the power conversion device control system according to the aspect (1), when the temperature of the permanent magnet provided in the rotary electric machine is higher than the predetermined threshold value, the control device may control the power conversion device through synchronous control (for example, synchronous PWM control) in which the carrier frequency of the power conversion device is proportional to the rotational speed of the rotary electric machine. For this reason, in the power conversion device control system according to the aspect (1), increase in temperature of the permanent magnet of the rotary electric machine can be suppressed and reliability can be improved.

In the power conversion device control system according to the aspect (1), when the temperature of the permanent magnet of the rotary electric machine is the predetermined threshold value or less, the control device controls the power conversion device through non-synchronous control in which the carrier frequency of the power conversion device is not proportional to the rotational speed of the rotary electric machine. For this reason, in the power conversion device control system according to the aspect (1), noise and vibration according to switching of the carrier frequency can be suppressed, and marketability can be improved.

That is, in the power conversion device control system according to the aspect (2), reliability and marketability can both be realized by switching between the synchronous control and the non-synchronous control according to a temperature condition of the permanent magnet of the rotary electric machine.

The motor system of the aspect (2) may include the power conversion device control system according to the aspect (1), and the traveling/driving motor as the rotary electric machine, wherein the control device may control the power conversion device configured to supply electric power to the traveling/driving motor through the synchronous control and the non-synchronous control.

When the control device controls the power conversion device through the synchronous control and the non-synchronous control, in the motor system according to the aspect (2), noise and vibration according to switching of the carrier frequency can be suppressed and marketability can be improved while improving reliability by suppressing increase in temperature of the permanent magnet of the rotary electric machine.

The composite system according to the aspect (3) includes the power conversion device control system and the rotary electric machine according to the aspect (1), and the internal combustion engine, and when the internal combustion engine is operating, the control device may allow control of the power conversion device through the synchronous control.

When the control device allows control of the power conversion device through the synchronous control, in the composite system according to the aspect (3), during an operation of the internal combustion engine, it is possible to satisfy a user by operating the internal combustion engine while improving energy saving properties by performing control of the power conversion device through the synchronous control.

The composite system according to the aspect (4) includes the power conversion device control system and the rotary electric machine according to the aspect (1), and the internal combustion engine, and when the rotational speed of the internal combustion engine is the predetermined rotational speed or more, the control device may allow control of the power conversion device through the synchronous control.

When the control device allows control of the power conversion device through the synchronous control, in the composite system according to the aspect (4), when the rotational speed of the internal combustion engine is the predetermined rotational speed or more, it is possible to satisfy a user by operating the internal combustion engine at the predetermined rotational speed or more while improving energy saving properties by performing control of the power conversion device through the synchronous control. In the power conversion device control system according to the aspect (5), the power conversion device control system according to the aspect (1) is mounted on the vehicle and the rotary electric machine is used for driving and traveling of the vehicle, and when the traveling speed of vehicle is the predetermined speed or more, the control device may allow control of the power conversion device through the synchronous control.

When the control device allows control of the power conversion device through the synchronous control, in the power conversion device control system according to the aspect (5), when the traveling speed of the vehicle is the predetermined speed or more, it is possible to satisfy a user according to a traveling speed of the vehicle of a predetermined speed or more while improving energy saving properties by performing control of the power conversion device through the synchronous control.

DETAILED DESCRIPTION OF THE INVENTION

Hereinafter, embodiments of a power conversion device control system, a motor system and a composite system of the present invention will be described with reference to the accompanying drawings.

First Embodiment

First, a first embodiment of the present invention will be described.

Figure 1:
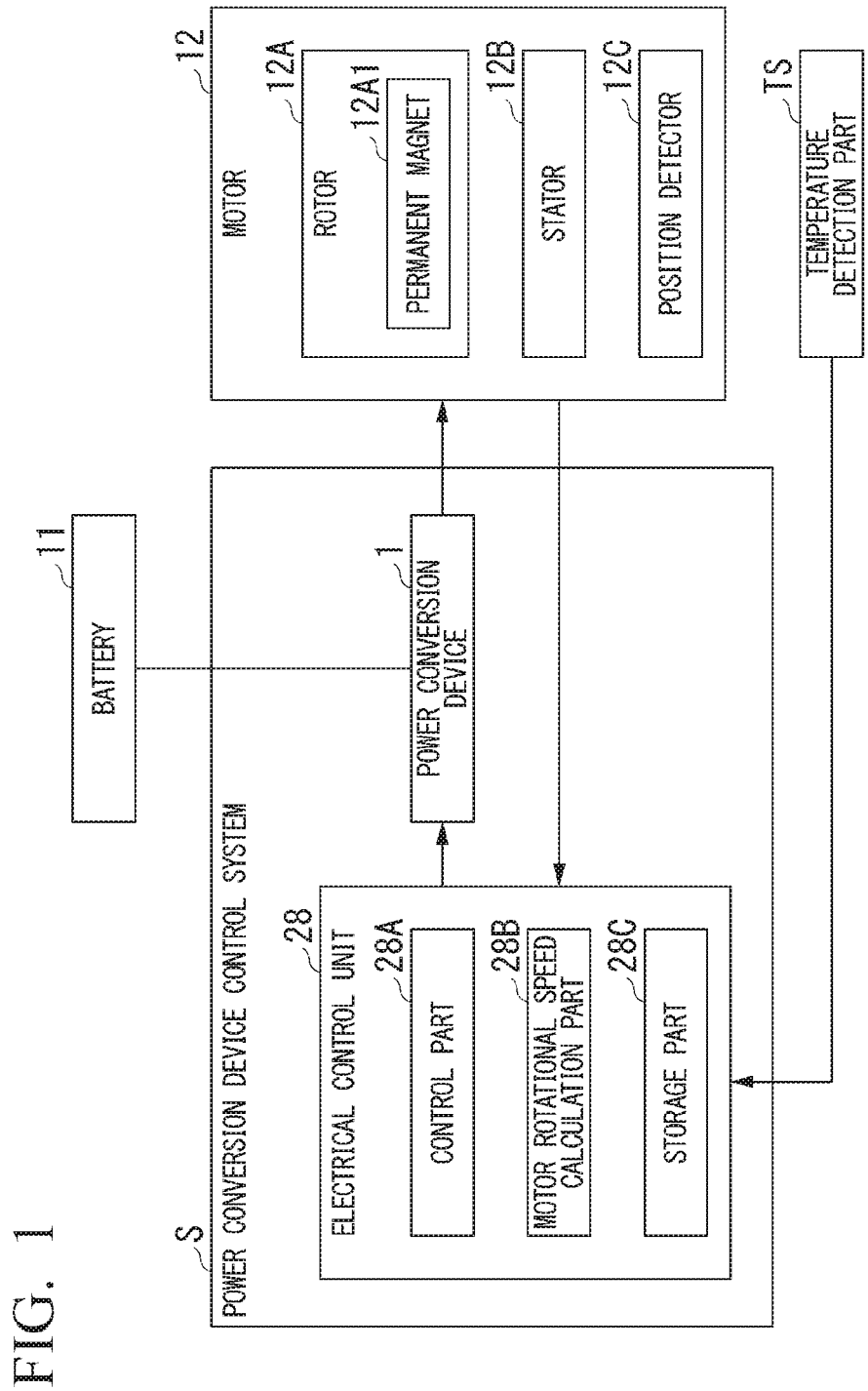
FIG. 1 is a view showing an example of a function of a power conversion device control system or the like of a first embodiment.

FIG. 1 is a view showing an example of a function of a power conversion device control system S or the like of the first embodiment.

In an example shown in FIG. 1, the power conversion device control system S includes a power conversion device 1, and an electronic control unit 28 that functions as a control device. The power conversion device 1 includes a plurality of switching elements (not shown), converts direct current electric power supplied from a battery 11 into alternating current electric power, and supplies the alternating current electric power to a motor 12 as a rotary electric machine. The electronic control unit 28 controls the motor 12 by controlling the power conversion device 1.

The motor 12 includes a rotor 12A, a stator 12B and a position detector 12C. The rotor 12A includes a permanent magnet 12A1. The position detector 12C detects a rotational angle of the rotor 12A with respect to the stator 12B. A temperature in a housing (not shown) of the motor 12 is detected by a temperature detection part TS.

Figure 2:
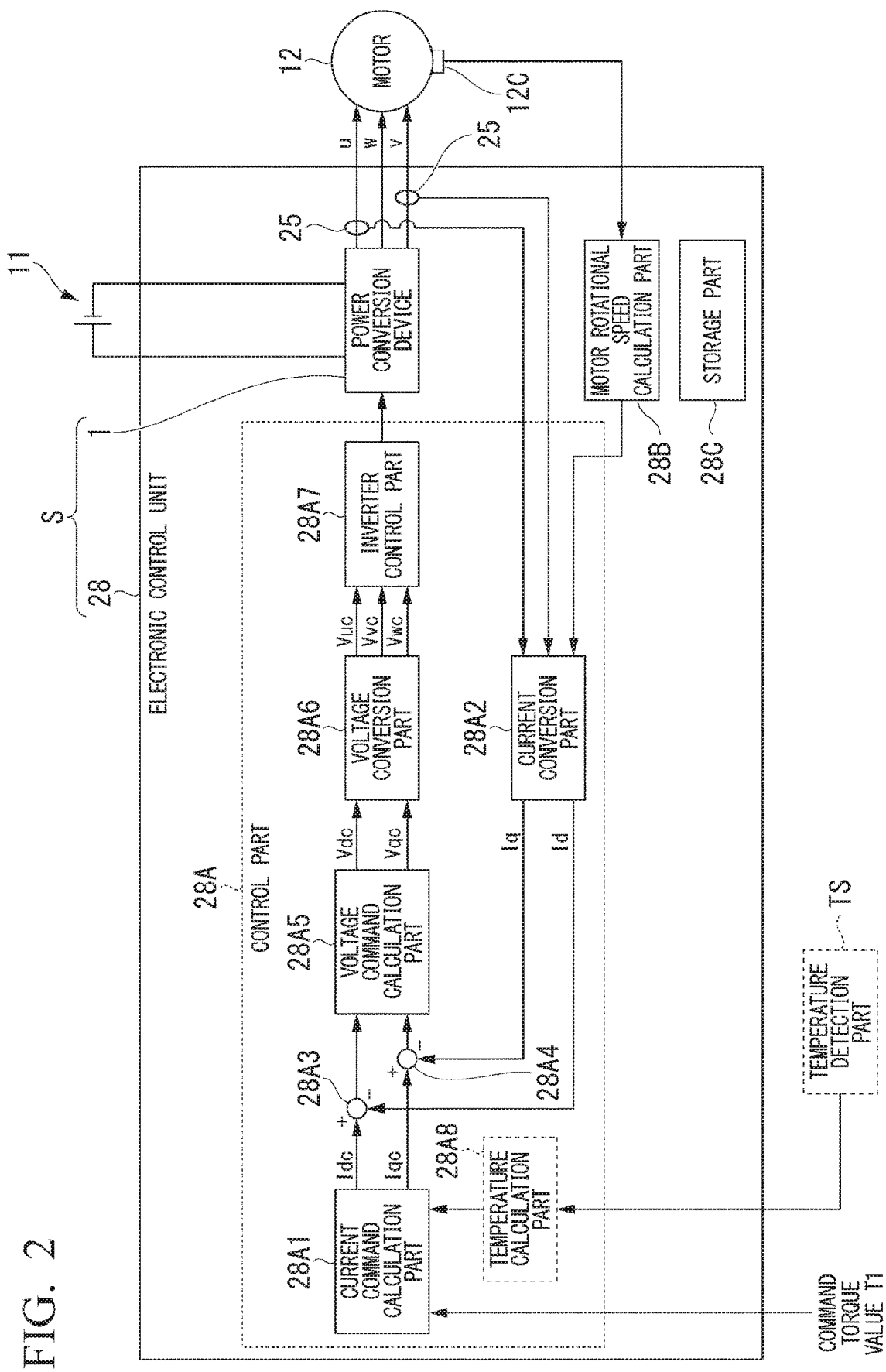
FIG. 2 is a detailed view showing an electronic control unit or the like in FIG. 1.
Figure 3:
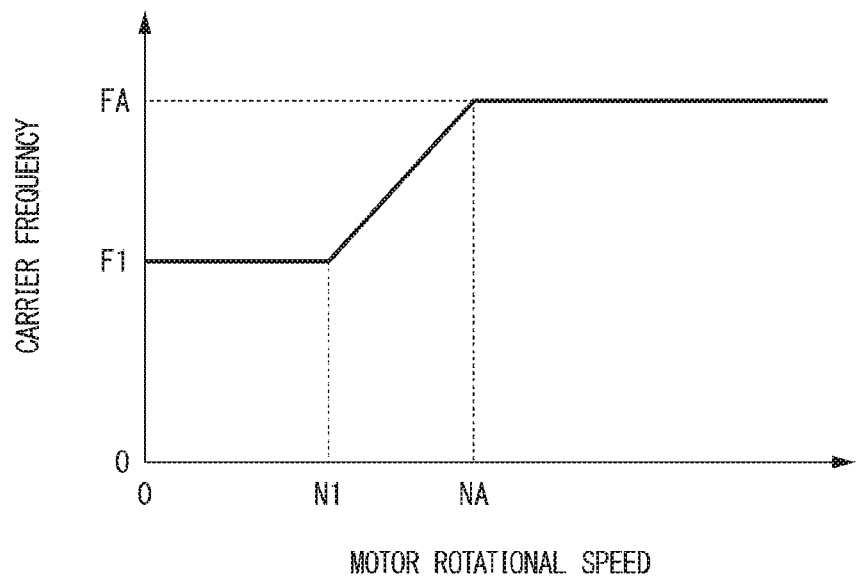
FIG. 3 is a view showing an example of a non-synchronous PWM control map stored by a storage part in FIG. 1 and FIG. 2.
Figure 4:
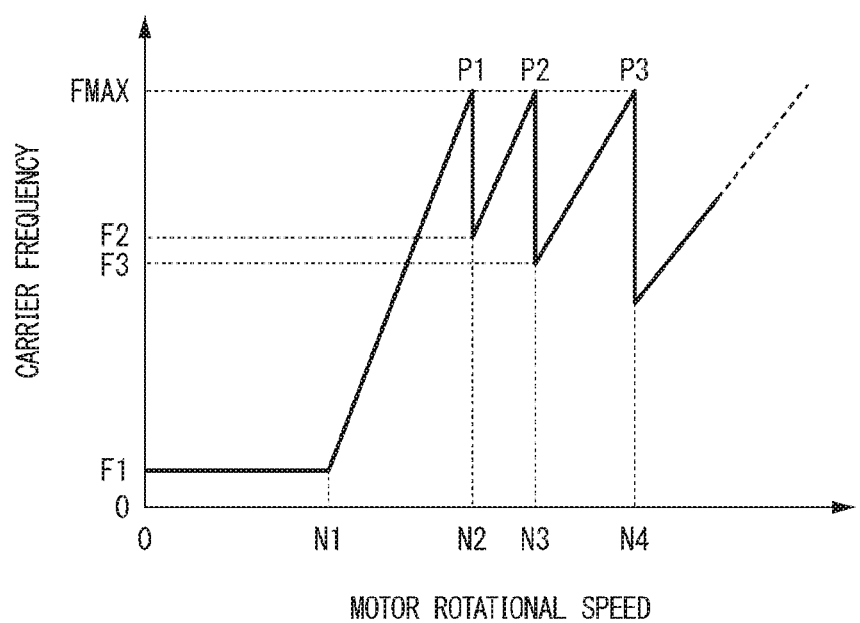
FIG. 4 is a view showing an example of a synchronous PWM control map stored by the storage part in FIG. 1 and FIG. 2.

The electronic control unit 28 includes a control part 28A, a motor rotational speed calculation part 28B and a storage part 28C. For example, the control part 28A is configured as shown in FIG. 2. The motor rotational speed calculation part 28B calculates a rotational speed of the motor 12 on the basis of a signal output from the position detector 12C. For example, the storage part 28C stores a control map as shown in FIG. 3 and FIG. 4.

FIG. 2 is a detailed view of the electronic control unit 28 or the like in FIG. 1.

In the example shown in FIG. 2, the control part 28A of the electronic control unit 28 includes a current command calculation part 28A1, a current conversion part 28A2, a subtractor 28A3, a subtractor 28A4, a voltage command calculation part 28A5, a voltage conversion part 28A6, an inverter control part 28A7 (a gate drive unit 29 (see FIG. 10)), and a temperature calculation part 28A8.

The current command calculation part 28A1 sets an amplitude and a phase of a driving current necessary for setting an output torque of the motor 12 to a command torque value T1. The current command calculation part 28A1 calculates an excitation current command value Idc and a torque current command value Iqc on the basis of the set an amplitude and phase.

The current conversion part 28A2 converts driving currents of, for example, a U phase and a V phase detected by a current sensor 25 into an excitation current Id and a torque current Iq.

The subtractor 28A3 obtains a deviation (a difference) between the excitation current command value Idc and the excitation current Id by subtracting the excitation current Id converted by the current conversion part 28A2 from the excitation current command value Idc calculated by the current command calculation part 28A1. The subtractor 28A4 obtains a deviation (a difference) between the torque current command value Iqc and the torque current Iq by subtracting the torque current Iq converted by the current conversion part 28A2 from the torque current command value Iqc calculated by the current command calculation part 28A1.

The voltage command calculation part 28A5 calculates a voltage command value (an excitation voltage command value) Vdc of a d axis and a voltage command value (a torque voltage command value) Vqc of a q axis according to the deviation (the difference) (Idc-Id) obtained by the subtractor 28A3 and the deviation (the difference) (Iqc-Iq) obtained by the subtractor 28A4. The voltage command calculation part 28A5 calculates an excitation voltage command value Vdc and a torque voltage command value Vqc on the basis of feedback control of PI control or the like such that each of the deviation (the difference) (Idc-Id) and the deviation (the difference) (Iqc-Iq) is brought into "0."

The voltage conversion part 28A6 converts the excitation voltage command value Vdc and the torque voltage command value Vqc calculated by the voltage command calculation part 28A5 into a command voltage value Vuc of an applied voltage of a U phase, a command voltage value Vvc of an applied voltage of a V phase, and a command voltage value Vwc of an applied voltage of a W phase of the motor 12.

The command voltage values Vuc, Vvc and Vwc define a magnitude and a phase of the applied voltage of each phase of the motor 12.

The inverter control part 28A7 (the gate drive unit 29) delivers a control signal for controlling a plurality of switching elements of the power conversion device 1 to the power conversion device 1 on the basis of the command voltage values Vuc, Vvc and Vwc converted by the voltage conversion part 28A6. Accordingly, the amplitude and the phase of the 3-phase driving current output from the power conversion device 1 become the amplitude and the phase set by the current command calculation part 28A1, and the voltages applied to the phases of the motor 12 become the command voltage values Vuc, Vvc and Vwc. Accordingly, an output torque of the motor 12 is brought into the command torque value T1.

The temperature calculation part 28A8 calculates a temperature of the permanent magnet 12A1 of the motor 12 on the basis of the signal output from the temperature detection part TS and known techniques.

FIG. 3 is a view showing an example of a non-synchronous pulse width modulation (PWM) control map stored by the storage part 28C in FIG. 1 and FIG. 2. A lateral axis of FIG. 3 represents a rotational speed of the motor 12. A vertical axis of FIG. 3 represents a carrier frequency of PWM control.

In the example shown in FIG. 3, a carrier frequency is set to a constant value F1 in a region in which a rotational speed of the motor 12 is from zero to a value N1. That is, a carrier frequency of PWM control is not proportional to the rotational speed of the motor 12 in the region in which the rotational speed of the motor 12 is from zero to the value N1.

The carrier frequency is increased to values F1 to FA as the rotational speed of the motor 12 is increased to the values N1 to NA in the region in which the rotational speed of the motor 12 is within the values N1 to NA.

The carrier frequency is set to a constant value FA in a region in which the rotational speed of the motor 12 is larger than the value NA. That is, the carrier frequency of the PWM control is not proportional to the rotational speed of the motor 12 in the region in which the rotational speed of the motor 12 is larger than the value NA.

FIG. 4 is a view showing an example of a synchronous PWM control map stored by the storage part 28C in FIG. 1 and FIG. 2. A lateral axis of FIG. 4 represents a rotational speed of the motor 12. A vertical axis of FIG. 4 represents a carrier frequency of PWM control.

In the example shown in FIG. 4, the region in which the rotational speed of the motor 12 is zero to the value N1 is set as "a non-synchronous region (a region in which synchronous PWM control is not able to be executed)." In the "non-synchronous region," the carrier frequency is set to the constant value F1, and non-synchronous PWM control is performed. The region in which the rotational speed of the motor 12 is larger than the value N1 is set as "a synchronous region." In the "synchronous region," synchronous PWM control is performed. The value N1 is set on the basis of an electrical angle fundamental frequency of the motor 12.

In the example shown in FIG. 4, like the example shown in FIG. 3, the carrier frequency is set to the constant value F1 in the "non-synchronous region" in which the rotational speed of the motor 12 is zero to the value N1.

In the "synchronous region" in which the rotational speed of the motor 12 is larger than the value N1, the set pulse number is decreased as the rotational speed of the motor 12 is increased. In the range in which the pulse number is a constant value, the carrier frequency is increased as the rotational speed of the motor 12 is increased.

For example, in a range in the "synchronous region" in which the rotational speed of the motor 12 is within the values N1 to N2, the pulse number is set to a value P1. The carrier frequency is increased to the values F1 to FMAX as the rotational speed of the motor 12 is increased to the values N1 to N2. Specifically, in the range in which the rotational speed of the motor 12 is within the values N1 to N2, the carrier frequency is proportional to the rotational speed of the motor 12.

In a range in the "synchronous region" in which the rotational speed of the motor 12 is within the values N2 to N3, the pulse number is set to the value P2 (<P1). The carrier frequency is increased to the values F2 to FMAX as the rotational speed of the motor 12 is increased to the values N2 to N3. A gradient (a degree of increase) of the carrier frequency in the range in which the rotational speed of the motor 12 is within the values N2 to N3 is smaller than a gradient of the carrier frequency in the range in which the rotational speed of the motor 12 is within the values N1 to N2. Specifically, in the range in which the rotational speed of the motor 12 is within the values N2 to N3, the carrier frequency is proportional to the rotational speed of the motor 12.

In a range in the "synchronous region" in which the rotational speed of the motor 12 is within the values N3 to N4, the pulse number is set to a value P3 (<P2). The carrier frequency is increased to the values F3 to FMAX as the rotational speed of the motor 12 is increased to the values N3 to N4. A gradient of the carrier frequency in the range in which the rotational speed of the motor 12 is within the values N3 to N4 is smaller than a gradient of the carrier frequency in the range in which the rotational speed of the motor 12 is within the values N2 to N3. Specifically, in the range in which the rotational speed of the motor 12 is within the values N3 to N4, the carrier frequency is proportional to the rotational speed of the motor 12.

Figure 5:
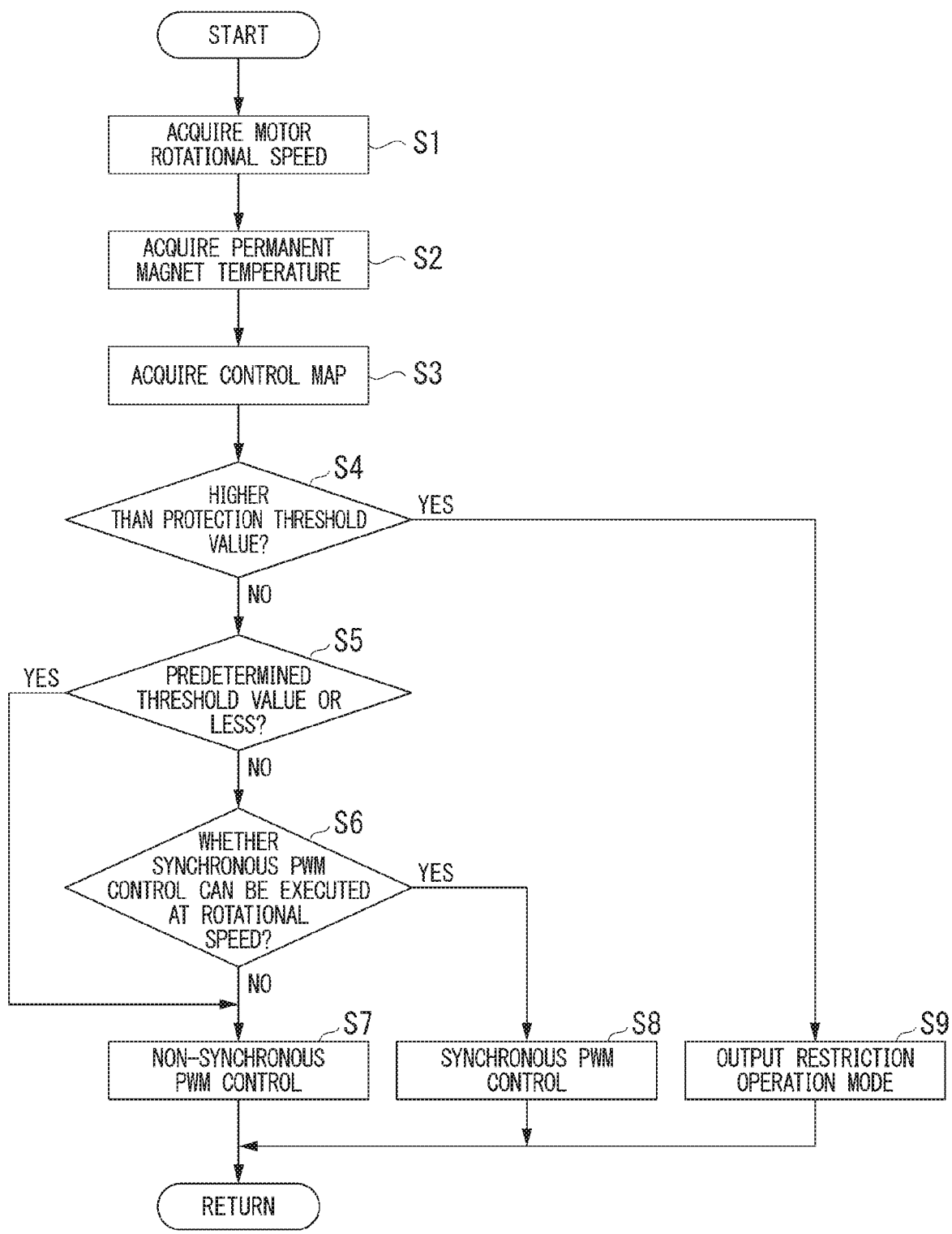
FIG. 5 is a flowchart showing an example of processing executed by an electronic control unit.

FIG. 5 is a flowchart showing an example of processing executed by the electronic control unit 28.

In the example shown in FIG. 5, in step S1, for example, the control part 28A of the electronic control unit 28 obtains a rotational speed of the motor 12 calculated by the motor rotational speed calculation part 28B.

Next, in step S2, for example, the control part 28A acquires a temperature of the permanent magnet 12A1 of the motor 12 calculated by the temperature calculation part 28A8.

Next, in step S3, for example, the control part 28A acquires a non-synchronous PWM control map (see FIG. 3) and a synchronous PWM control map (see FIG. 4) stored by the storage part 28C.

Next, in step S4, for example, the control part 28A determines whether a temperature of the permanent magnet 12A1 of the motor 12 is higher than a protection threshold value (specifically, a limit value of the temperature of the permanent magnet 12A1). When the temperature of the permanent magnet 12A1 is the protection threshold value or less, the processing advances to step S5. Meanwhile, when the temperature of the permanent magnet 12A1 is higher than the protection threshold value, the processing advances to step S9.

In step S5, for example, the control part 28A determines whether the temperature of the permanent magnet 12A1 of the motor 12 is the predetermined threshold value (<the protection threshold value) or less. When the temperature of the permanent magnet 12A1 is higher than the predetermined threshold value, the processing advances to step S6. Meanwhile, when the temperature of the permanent magnet 12A1 is the predetermined threshold value or less, the processing advances to step S7.

In step S6, for example, the control part 28A determines whether the rotational speed of the motor 12 is a rotational speed at which the synchronous PWM control can be executed. When the rotational speed of the motor 12 is a rotational speed at which the synchronous PWM control cannot be executed, specifically, when the rotational speed of the motor 12 is zero to the value N1 (see FIG. 3 and FIG. 4), the processing advances to step S7. When the rotational speed of the motor 12 is a rotational speed at which the synchronous PWM control can be executed, specifically, when the rotational speed of the motor 12 is larger than the value N1, the processing advances to step S8.

In step S7, the control part 28A controls the power conversion device 1 through the non-synchronous PWM control based on the non-synchronous PWM control map shown in FIG. 3. That is, in step S7, the power conversion device control system S is brought into a normal operation mode.

For example, when the rotational speed of the motor 12 is zero to the value N1, the control part 28A sets the carrier frequency to a value F1 (i.e., maintains the carrier frequency), and executes the non-synchronous PWM control. When the rotational speed of the motor 12 is within the values N1 to NA, the control part 28A sets the carrier frequency to the values F1 to FA and executes the non-synchronous PWM control. When the rotational speed of the motor 12 is larger than the value NA, the control part 28A sets the carrier frequency to the value FA (i.e., maintains the carrier frequency), and executes the non-synchronous PWM control.

In step S8, the control part 28A controls the power conversion device 1 through the synchronous PWM control based on the synchronous PWM control map shown in FIG. 4. That is, in step S8, the power conversion device control system S is brought into a magnet temperature increase suppression mode.

For example, when the rotational speed of the motor 12 is within the values N1 to N2, the control part 28A sets the pulse number to the value P1, sets the carrier frequency to the values F1 to FMAX, and executes the synchronous PWM control.

When the rotational speed of the motor 12 is within the values N2 to N3, the control part 28A sets the pulse number to the value P2, sets the carrier frequency to the values F2 to FMAX, and executes the synchronous PWM control. When the rotational speed of the motor 12 is within the values N3 to N4, the control part 28A sets the pulse number to the value P3, sets the carrier frequency to the values F3 to FMAX, and executes the synchronous PWM control.

In step S9, the control part 28A performs control of restricting an output of the motor 12. That is, in step S9, the power conversion device control system S is brought into an output restriction operation mode (a power save operation mode). In the output restriction operation mode, the output of the motor 12 is forcibly restricted, and the temperature of the permanent magnet 12A1 is decreased. Accordingly, the possibility of the permanent magnet 12A1 becoming demagnetized is curbed.

As described above, in the power conversion device control system S of the first embodiment, when the temperature of the permanent magnet 12A1 provided in the motor 12 as the rotary electric machine is higher than the predetermined threshold value and when the temperature of the permanent magnet 12A1 of the motor 12 is the protection threshold value or less, NO is determined in step S5 in FIG. 5, and the control part 28A controls the power conversion device 1 through synchronous control (specifically, synchronous PWM control) in which the carrier frequency is proportional to the rotational speed of the motor 12 in step S8. For this reason, in the power conversion device control system S of the first embodiment, increase in temperature of the permanent magnet 12A1 of the motor 12 can be suppressed, and reliability can be improved.

In addition, in the power conversion device control system S of the first embodiment, when the temperature of the permanent magnet 12A1 of the motor 12 is the predetermined threshold value or less (in the case of YES in step S5), the control part 28A controls the power conversion device 1 through the non-synchronous control (specifically, the non-synchronous PWM control) in which the carrier frequency is not proportional to the rotational speed of the motor 12. In addition, when the temperature of the permanent magnet 12A1 of the motor 12 is the protection threshold value or less (in the case of NO in step S4), when the temperature of the permanent magnet 12A1 of the motor 12 is higher than the predetermined threshold value (in the case of NO in step S5) and when the rotational speed of the motor 12 is a low rotational speed at which the synchronous PWM control cannot be executed (in the case of NO in step S6), the control part 28A controls the power conversion device 1 through the non-synchronous control (the non-synchronous PWM control) in which the carrier frequency is not proportional to the rotational speed of the motor 12.

For this reason, in the power conversion device control system S of the first embodiment, noise and vibration according to switching of the carrier frequency can be suppressed, and marketability can be improved. That is, in the power conversion device control system S of the first embodiment, compatibility between reliability and marketability can be realized by switching between synchronous control and non-synchronous control according to temperature conditions of the permanent magnet 12A1 of the motor 12.

Specifically, in the power conversion device control system S of the first embodiment, when the rotational speed of the motor 12 is within the values N1 to N4 and when the temperature of the permanent magnet 12A1 of the motor 12 is higher than the predetermined threshold value, the temperature of the permanent magnet 12A1 can be decreased and reliability of the power conversion device control system S can be improved by performing the synchronous PWM control in which the carrier frequency is proportional to the rotational speed of the motor 12.

In addition, in the power conversion device control system S of the first embodiment, when the rotational speed of the motor 12 is within the values N1 to N4 and when the temperature of the permanent magnet 12A1 of the motor 12 is the predetermined threshold value or less, noise and vibration according to switching of the carrier frequency can be suppressed and marketability of the power conversion device control system S can be improved by executing the non-synchronous PWM control in which the carrier frequency is not proportional to the rotational speed of the motor 12. That is, in the power conversion device control system S of the first embodiment, control of protecting the permanent magnet 12A1 (synchronous PWM control) and control of improving marketability (non-synchronous PWM control) are switched between according to the temperature of the permanent magnet 12A1 of the motor 12. As a result, improvement in reliability and improvement in marketability of the power conversion device control system S can both be achieved.

Second Embodiment

Hereinafter, a second embodiment of the present invention will be described.

A motor system MS of the second embodiment has the same configuration as that of the power conversion device control system S of the above-mentioned first embodiment except for the points to be described below. Accordingly, according to the motor system MS of the second embodiment, the same effects as those of the power conversion device control system S of the above-mentioned first embodiment can be exhibited except for the points to be described below.

Figure 6:
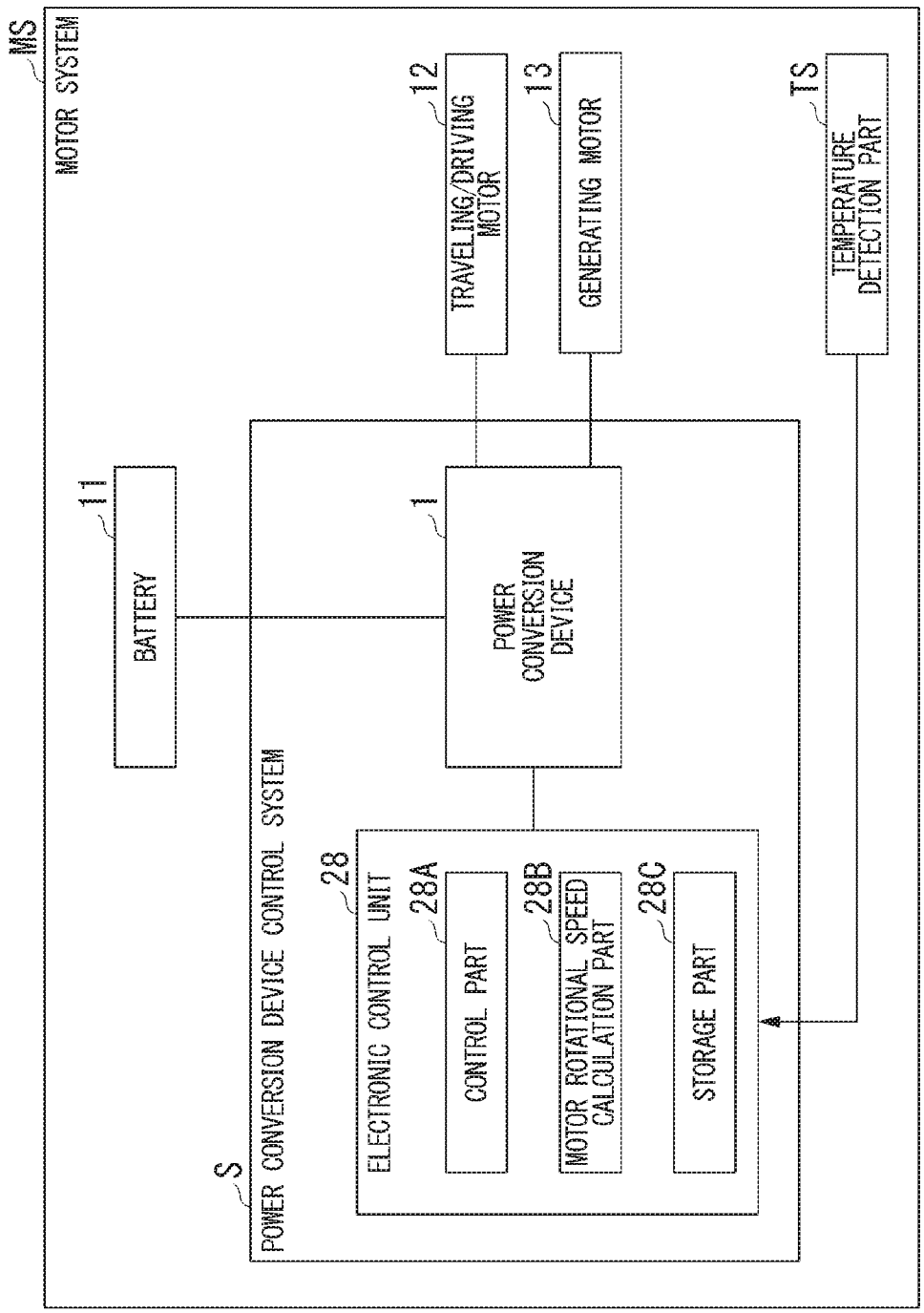
FIG. 6 is a view showing an example of a motor system of a second embodiment.

FIG. 6 is a view showing an example of the motor system MS of the second embodiment.

In the example shown in FIG. 6, the motor system MS includes the power conversion device control system S and the battery 11 that are configured like the power conversion device control system S of the first embodiment, a traveling/driving motor 12 serving as a rotary electric machine, and a generating motor 13.

The traveling/driving motor 12 generates a rotation driving force (a power-run operation) using electric power supplied from the battery 11. The traveling/driving motor 12 of the motor system MS of the second embodiment is configured like the motor 12 of the power conversion device control system S of the first embodiment.

The generating motor 13 generates generated electric power using a rotation driving force input to a rotary shaft (not shown).

The power conversion device 1 converts direct current electric power supplied from the battery 11 into alternating current electric power, and supplies the alternating current electric power to the traveling/driving motor 12.

The electronic control unit 28 controls the traveling/driving motor 12 by controlling the power conversion device 1. Specifically, the electronic control unit 28 controls the power conversion device 1 configured to supply electric power to the traveling/driving motor 12 through synchronous control (specifically, synchronous PWM control) and non-synchronous control (specifically, non-synchronous PWM control).

The non-synchronous PWM control map of the motor system MS of the second embodiment is configured like the non-synchronous PWM control map of the power conversion device control system S of the first embodiment shown in FIG. 3.

The synchronous PWM control map of the motor system MS of the second embodiment is configured like the synchronous PWM control map of the power conversion device control system S of the first embodiment shown in FIG. 4.

The electronic control unit 28 of the motor system MS of the second embodiment executes the processing shown in FIG. 5 like the electronic control unit 28 of the power conversion device control system S of the first embodiment.

Specifically, in step S1 in FIG. 5, for example, the control part 28A of the electronic control unit 28 obtains a rotational speed of the traveling/driving motor 12 calculated by the motor rotational speed calculation part 28B.

In step S2 in FIG. 5, for example, the control part 28A acquires a temperature of the permanent magnet 12A1 of the traveling/driving motor 12 calculated by the temperature calculation part 28A8.

In step S3 in FIG. 5, for example, the control part 28A acquires the above-mentioned non-synchronous PWM control map and the above-mentioned synchronous PWM control map.

In step S4 in FIG. 5, for example, the control part 28A determines whether the temperature of the permanent magnet 12A1 of the traveling/driving motor 12 is higher than the protection threshold value (specifically, a limit value of a temperature of the permanent magnet 12A1).

In step S5 in FIG. 5, for example, the control part 28A determines whether the temperature of the permanent magnet 12A1 of the traveling/driving motor 12 is the predetermined threshold value or less (<the protection threshold value).

In step S6 in FIG. 5, for example, the control part 28A determines whether the rotational speed of the traveling/driving motor 12 is the rotational speed at which the synchronous PWM control can be executed.

In step S7 in FIG. 5, the control part 28A executes the non-synchronous PWM control based on the above-mentioned non-synchronous PWM control map, suppresses noise and vibration according to switching of the carrier frequency, and improves marketability of the motor system MS.

In step S8 in FIG. 5, the control part 28A executes the synchronous PWM control based on the above-mentioned synchronous PWM control map, suppresses an increase in temperature of the permanent magnet 12A1 of the traveling/driving motor 12, and improves reliability of the motor system MS.

In step S9 in FIG. 5, the control part 28A performs control of restricting an output of the motor 12, and decreases a temperature of the permanent magnet 12A1.

That is, in the motor system MS of the second embodiment, control (synchronous PWM control) of protecting the permanent magnet 12A1 and control (non-synchronous PWM control) of improving marketability are switched according to the temperature of the permanent magnet 12A1 of the traveling/driving motor 12. As a result, improvement in reliability and improvement in marketability of the motor system MS can both be achieved.

Third Embodiment

Hereinafter, a third embodiment of the present invention will be described.

A composite system CS of the third embodiment is configured like the power conversion device control system S of the above-mentioned first embodiment except for the points to be described below. Accordingly, according to the composite system CS of the third embodiment, the same effects as those of the power conversion device control system S of the above-mentioned first embodiment can be exhibited except for the points to be described below.

Figure 7:
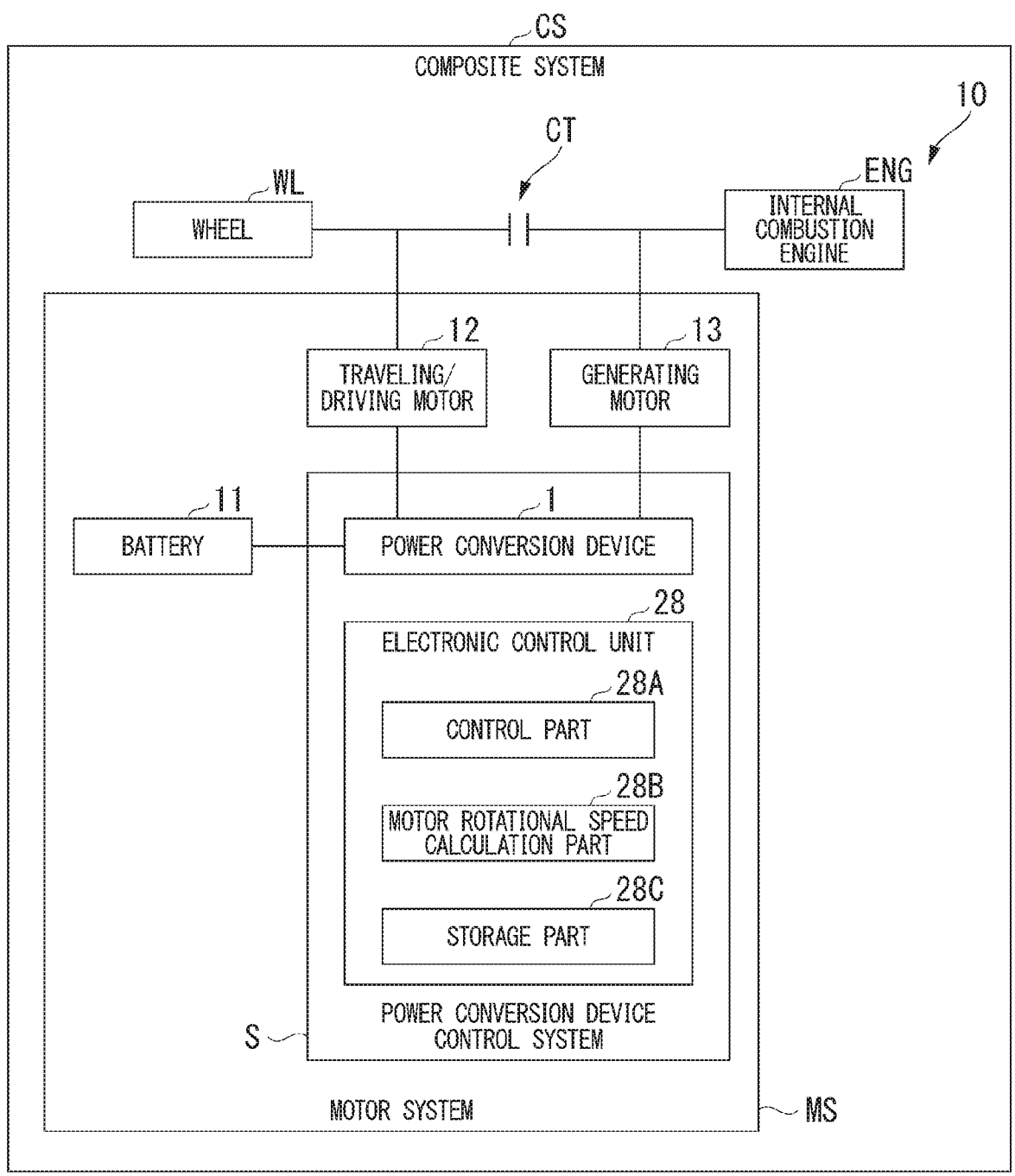
FIG. 7 is a view showing an example of a composite system of a third embodiment.

FIG. 7 is a view showing an example of the composite system CS of the third embodiment.

In the example shown in FIG. 7, the composite system CS includes the power conversion device control system S, the battery 11, the traveling/driving motor 12 as the rotary electric machine and the generating motor 13, which are configured like the power conversion device control system S of the first embodiment, an internal combustion engine ENG, a wheel WL and a clutch CT.

The composite system CS is applied to a vehicle 10. That is, the power conversion device control system S is mounted on the vehicle 10.

The traveling/driving motor 12 generates a rotation driving force (a power-run operation) using electric power supplied from the battery 11, and drives the wheel WL of the vehicle 10. The traveling/driving motor 12 of the composite system CS of the third embodiment is configured like the motor 12 of the power conversion device control system S of the first embodiment.

The wheel WL can also be driven by the internal combustion engine ENG. The clutch CT is disposed between the wheel WL and the internal combustion engine ENG. When the wheel WL and the internal combustion engine ENG are connected via the clutch CT, the internal combustion engine ENG can drive the wheel WL. The generating motor 13 generates the generated electric power using a rotation driving force generated by the internal combustion engine ENG.

The power conversion device 1 converts direct current electric power supplied from the battery 11 into alternating current electric power, and supplies the alternating current electric power to the traveling/driving motor 12.

The electronic control unit 28 controls the traveling/driving motor 12 by controlling the power conversion device 1. Specifically, the electronic control unit 28 controls the power conversion device 1 configured to supply electric power to the traveling/driving motor 12 through synchronous control (specifically, synchronous PWM control) and non-synchronous control (specifically, non-synchronous PWM control).

The non-synchronous PWM control map of the composite system CS of the third embodiment is configured like the non-synchronous PWM control map of the power conversion device control system S of the first embodiment shown in FIG. 3.

The synchronous PWM control map of the composite system CS of the third embodiment is configured like the synchronous PWM control map of the power conversion device control system S of the first embodiment shown in FIG. 4.

Figure 8:
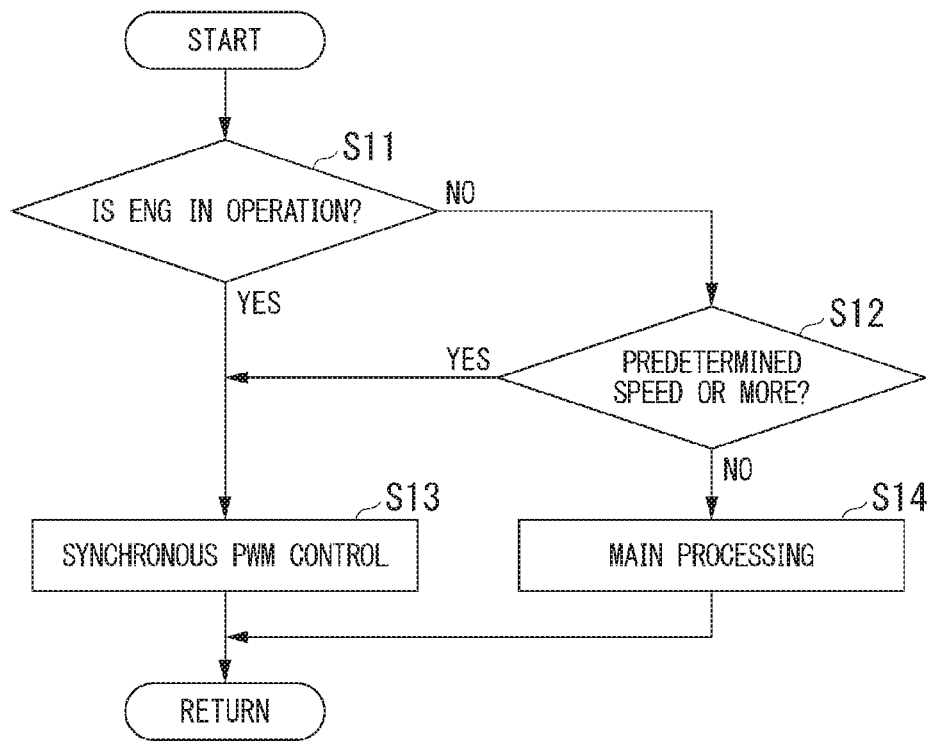
FIG. 8 is a flowchart showing an example of processing executed by an electronic control unit of the composite system of the third embodiment.

FIG. 8 is a flowchart showing an example of processing executed by the electronic control unit 28 of the composite system CS of the third embodiment.

In the example shown in FIG. 8, in step S11, the composite system CS determines whether the internal combustion engine ENG is operating. When the internal combustion engine ENG is not operated, the processing advances to step S12. Meanwhile, when the internal combustion engine ENG is operating, the processing advances to step S13.

In step S12, the composite system CS determines whether a traveling speed of the vehicle 10 is a predetermined speed or more. When the traveling speed of the vehicle 10 is the predetermined speed or more, the processing advances to step S13. Meanwhile, when the traveling speed of the vehicle 10 is less than the predetermined speed, the processing advances to step S14.

In step S13, the control part 28A controls the power conversion device 1 through the synchronous PWM control based on the above-mentioned synchronous PWM control map. That is, in step S13, the power conversion device control system S is brought into the synchronous PWM control mode (the magnet temperature increase suppression mode).

In step S14, the electronic control unit 28 executes the same main processing as that of processing shown in FIG. 5.

That is, in step S14, when the temperature of the permanent magnet 12A1 of the traveling/driving motor 12 is the protection threshold value or less (in the case of NO in step S4 in FIG. 5), when the temperature of the permanent magnet 12A1 of the traveling/driving motor 12 is higher than the predetermined threshold value (in the case of NO in step S5 in FIG. 5) and when the rotational speed of the traveling/driving motor 12 is the rotational speed at which the synchronous PWM control can be executed (in the case of YES in step S6 in FIG. 5), the control part 28A controls the power conversion device 1 through the synchronous PWM control based on the above-mentioned synchronous PWM control map (step S8 in FIG. 5). That is, the power conversion device control system S is brought into the synchronous PWM control mode.

In step S14, when the temperature of the permanent magnet 12A1 of the traveling/driving motor 12 is the predetermined threshold value or less (in the case of NO in step S4 and YES in step S5 in FIG. 5), the control part 28A controls the power conversion device 1 through the non-synchronous PWM control based on the above-mentioned non-synchronous PWM control map (step S7 in FIG. 5). That is, the power conversion device control system S is brought into the normal operation mode.

In addition, in step S14, when the temperature of the permanent magnet 12A1 of the traveling/driving motor 12 is the protection threshold value or less (in the case of NO in step S4 in FIG. 5), when the temperature of the permanent magnet 12A1 of the traveling/driving motor 12 is higher than the predetermined threshold value (in the case of NO in step S5 in FIG. 5) and when the rotational speed of the traveling/driving motor 12 is the rotational speed at which the synchronous PWM control cannot be executed (in the case of NO in step S6 in FIG. 5), the control part 28A executes the non-synchronous PWM control with respect to the power conversion device 1 based on the above-mentioned non-synchronous PWM control map (step S7 in FIG. 5). That is, the power conversion device control system S is brought into the normal operation mode.

As described above, in the power conversion device control system S of the first embodiment, when the temperature of the permanent magnet 12A1 of the motor 12 is higher than the predetermined threshold value, in step S8 in FIG. 5, the control part 28A controls the power conversion device 1 through the synchronous PWM control based on the synchronous PWM control map shown in FIG. 3.

Meanwhile, in the composite system CS of the third embodiment, when the internal combustion engine ENG is operating (in the case of YES in step S11 in FIG. 8), step S14 in FIG. 8 is not executed, and in step S13 in FIG. 8, the control part 28A controls the power conversion device 1 through the synchronous PWM control based on the above-mentioned synchronous PWM control map.

That is, in the composite system CS of the third embodiment, when the internal combustion engine ENG is operating (in the case of YES in step S11 in FIG. 8), and even when the temperature of the permanent magnet 12A1 of the traveling/driving motor 12 is the predetermined threshold value or less, the control part 28A allows control of the power conversion device 1 through the synchronous PWM control based on the above-mentioned synchronous PWM control map.

For this reason, in the composite system CS of the third embodiment, during operation of the internal combustion engine ENG (in the case of YES in step S11 in FIG. 8), it is possible to satisfy a user through an operation of the internal combustion engine ENG while improving energy saving properties by performing the synchronous PWM control of the traveling/driving motor 12.

That is, in the composite system CS of the third embodiment, since the synchronous PWM control of the traveling/driving motor 12 is performed while performing the operation of the internal combustion engine ENG, it is possible to suppress the possibility that a user complains performance of the synchronous PWM control of the traveling/driving motor 12.

In addition, in the composite system CS of the third embodiment, when the traveling speed of the vehicle 10 is the predetermined speed or more (in the case of YES in step S12 in FIG. 8), step S14 in FIG. 8 is not executed, and in step S13 in FIG. 8, the control part 28A controls the power conversion device 1 through the synchronous PWM control based on the above-mentioned synchronous PWM control map.

That is, in the composite system CS of the third embodiment, when the traveling speed of the vehicle 10 is the predetermined speed or more (in the case of YES in step S12 in FIG. 8) and even when the temperature of the permanent magnet 12A1 of the traveling/driving motor 12 is the predetermined threshold value or less, the control part 28A allows control of the power conversion device 1 through the synchronous PWM control based on the above-mentioned synchronous PWM control map.

For this reason, in the composite system CS of the third embodiment, when the traveling speed of the vehicle 10 is the predetermined speed or more (in the case of YES in step S12 in FIG. 8), it is possible to satisfy a user according to a traveling speed of the vehicle 10 of a predetermined speed or more while improving energy saving properties by performing the synchronous PWM control of the traveling/driving motor 12. That is, in the composite system CS of the third embodiment, since the synchronous PWM control of the traveling/driving motor 12 is performed in a state in which the traveling speed of the vehicle 10 is the predetermined speed or more, it is possible to suppress the possibility that a user complains performance of the synchronous PWM control of the traveling/driving motor 12.

Fourth Embodiment

Hereinafter, a fourth embodiment of the present invention will be described.

The composite system CS of the fourth embodiment is configured like the composite system CS of the above-mentioned third embodiment except for the points to be described below. Accordingly, according to the composite system CS of the fourth embodiment, the same effects as those of the composite system CS of the above-mentioned third embodiment can be exhibited except for the points to be described below.

The non-synchronous PWM control map of the composite system CS of the fourth embodiment is configured like the non-synchronous PWM control map of the power conversion device control system S of the first embodiment shown in FIG. 3. The synchronous PWM control map of the composite system CS of the fourth embodiment is configured like the synchronous PWM control map of the power conversion device control system S of the first embodiment shown in FIG. 4.

Figure 9:
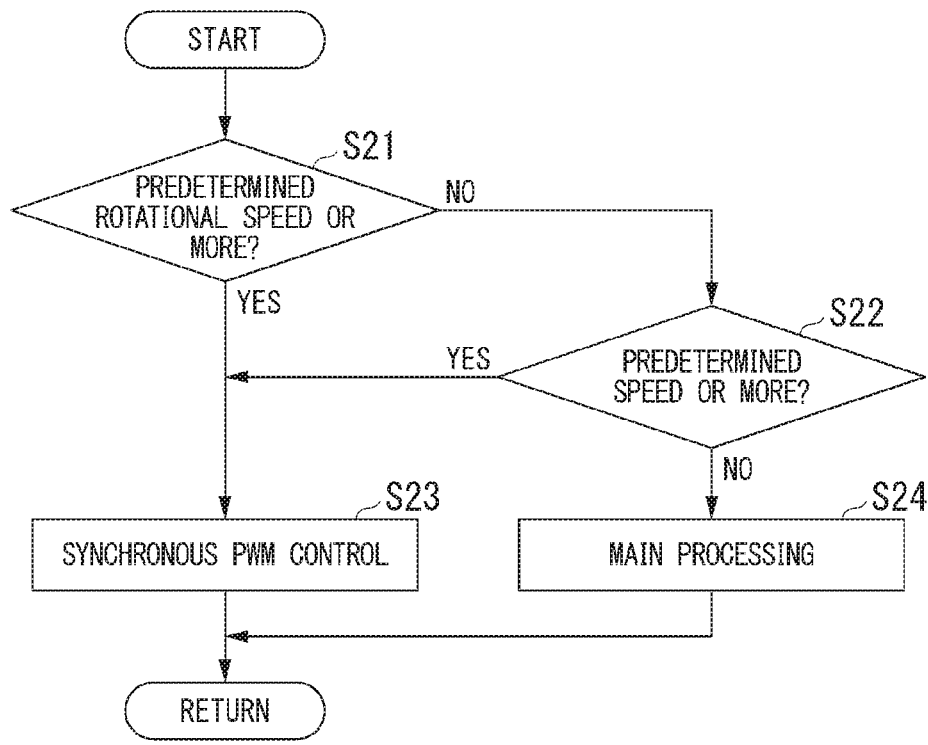
FIG. 9 is a flowchart showing an example of processing executed by an electronic control unit of a composite system of a fourth embodiment.

FIG. 9 is a flowchart showing an example of processing executed by the electronic control unit 28 of the composite system CS of the fourth embodiment.

In the example shown in FIG. 9, in step S21, the composite system CS determines whether the rotational speed of the internal combustion engine ENG is the predetermined rotational speed or more. When the rotational speed of the internal combustion engine ENG is less than the predetermined rotational speed, the processing advances to step S22. Meanwhile, when the rotational speed of the internal combustion engine ENG is the predetermined rotational speed or more, the processing advances to step S23.

In step S22, the composite system CS determines whether the traveling speed of the vehicle 10 is the predetermined speed or more. When the traveling speed of the vehicle 10 is the predetermined speed or more, the processing advances to step S23. Meanwhile, when the traveling speed of the vehicle 10 is less than the predetermined speed, the processing advances to step S24.

In step S23, like step S13, the control part 28A controls the power conversion device 1 through the synchronous PWM control based on the above-mentioned synchronous PWM control map. That is, in step S23, the power conversion device control system S is brought into the synchronous PWM control mode (the magnet temperature increase suppression mode).

In step S24, the electronic control unit 28 executes the same main processing as the processing shown in FIG. 5 (i.e., the same processing as that in step S14 in FIG. 8). As described above, in the power conversion device control system S of the first embodiment, when the temperature of the permanent magnet 12A1 of the motor 12 is higher than the predetermined threshold value, in step S8 in FIG. 5, the control part 28A executes the synchronous PWM control with respect to the power conversion device 1 based on the synchronous PWM control map shown in FIG. 3.

Meanwhile, in the composite system CS of the fourth embodiment, when the rotational speed of the internal combustion engine ENG is the predetermined rotational speed or more (in the case of YES in step S21 in FIG. 9), step S24 in FIG. 9 is not executed, in step S23 in FIG. 9, the control part 28A controls the power conversion device 1 through the synchronous PWM control based on the above-mentioned synchronous PWM control map.

That is, in the composite system CS of the fourth embodiment, when the rotational speed of the internal combustion engine ENG is the predetermined rotational speed or more (in the case of YES in step S21 in FIG. 9) and even when the temperature of the permanent magnet 12A1 of the traveling/driving motor 12 is the predetermined threshold value or less, the control part 28A allows control of the power conversion device 1 through the synchronous PWM control based on the above-mentioned synchronous PWM control map.

For this reason, in the composite system CS of the fourth embodiment, when the rotational speed of the internal combustion engine ENG is the predetermined rotational speed or more (in the case of YES in step S21 in FIG. 9), it is possible to satisfy a user through an operation of the internal combustion engine ENG of the predetermined rotational speed or more while improving energy saving properties by performing the synchronous PWM control of the traveling/driving motor 12. That is, in the composite system CS of the fourth embodiment, since the synchronous PWM control of the traveling/driving motor 12 is performed in a state in which the rotational speed of the internal combustion engine ENG is the predetermined rotational speed or more, it is possible to suppress the possibility that a user complains performance of the synchronous PWM control of the traveling/driving motor 12.

In addition, in the composite system CS of the fourth embodiment, when the traveling speed of the vehicle 10 is the predetermined speed or more (in the case of YES in step S22 in FIG. 9), step S24 in FIG. 9 is not executed, in step S23 in FIG. 9, the control part 28A controls the power conversion device 1 through the synchronous PWM control based on the above-mentioned synchronous PWM control map.

That is, in the composite system CS of the fourth embodiment, when the traveling speed of the vehicle 10 is the predetermined speed or more (in the case of YES in step S22 in FIG. 9) and even when the temperature of the permanent magnet 12A1 of the traveling/driving motor 12 is the predetermined threshold value or less, the control part 28A allows control of the power conversion device 1 through the synchronous PWM control based on the above-mentioned synchronous PWM control map.

For this reason, in the composite system CS of the fourth embodiment, when the traveling speed of the vehicle 10 is the predetermined speed or more (in the case of YES in step S22 in FIG. 9), it is possible to satisfy a user according to a traveling speed of the vehicle 10 of a predetermined speed or more while improving energy saving properties by performing the synchronous PWM control of the traveling/driving motor 12. That is, in the composite system CS of the fourth embodiment, since the synchronous PWM control of the traveling/driving motor 12 is performed in a state in which the traveling speed of the vehicle 10 is the predetermined speed or more, it is possible to suppress the possibility that a user complains performance of the synchronous PWM control of the traveling/driving motor 12.

Application Example

Hereinafter, application examples of the power conversion device control system S of the first embodiment, the motor system MS of the second embodiment, and the composite system CS of the third or fourth embodiment will be described with reference to the accompanying drawings.

Figure 10:
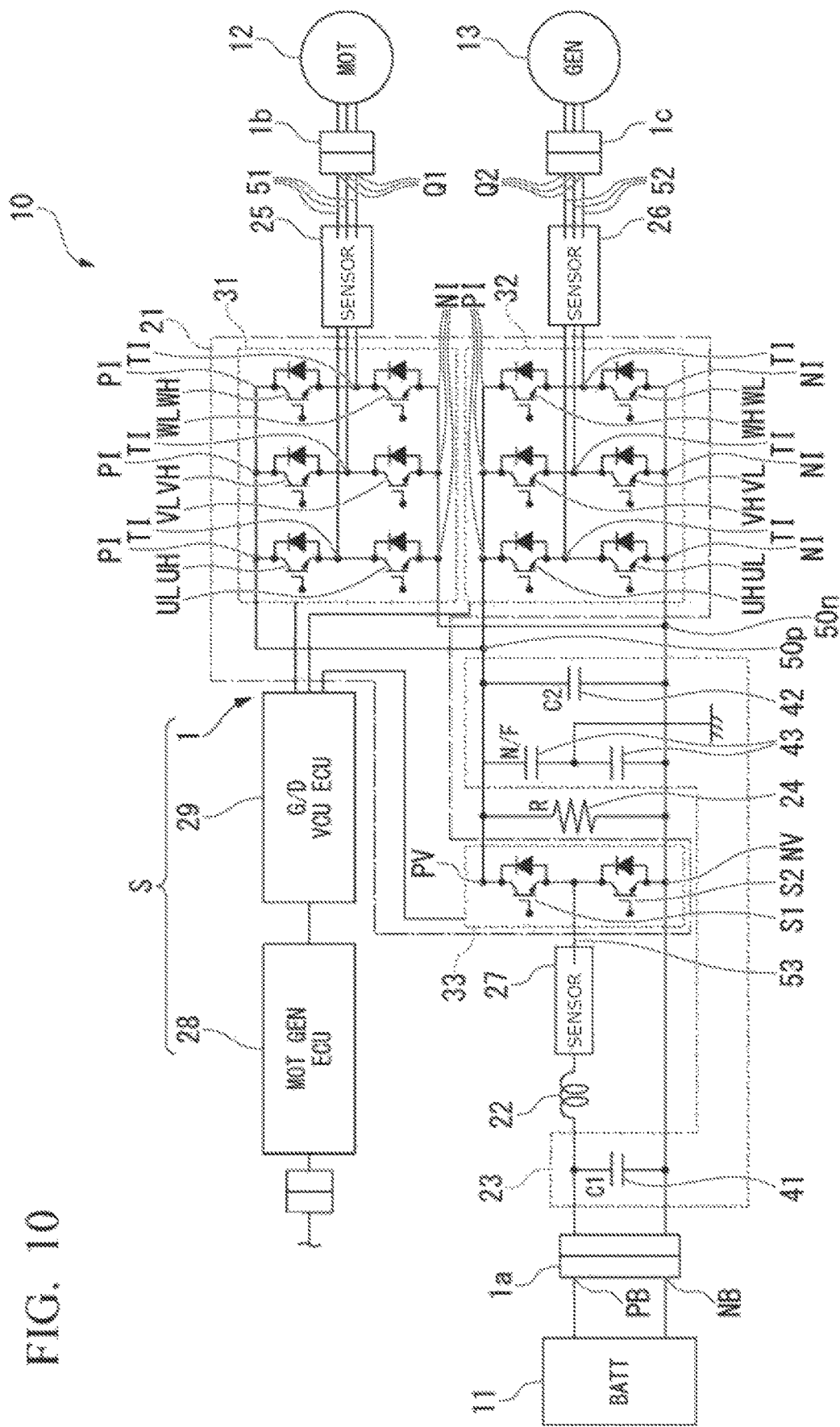
FIG. 10 is a view showing an example of a part of a vehicle, to which the power conversion device control system of the first embodiment, the motor system of the second embodiment, and the composite system of the third or fourth embodiment can be applied.

FIG. 10 is a view showing an example of a part of the vehicle 10, to which the power conversion device control system S of the first embodiment, the motor system MS of the second embodiment, and the composite system CS of the third or fourth embodiment are applicable.

In the example shown in FIG. 10, the vehicle 10 includes a battery 11 (BATT), a first motor 12 (MOT) for traveling/driving and a second motor 13 (GEN) for generating, in addition to the power conversion device 1 of the power conversion device control system S.

The battery 11 includes a battery case, and a plurality of battery modules accommodated in the battery case. The battery module includes a plurality of battery cells connected in series. The battery 11 includes a positive electrode terminal PB and a negative electrode terminal NB, which are connected to a direct current connector 1a of the power conversion device 1. The positive electrode terminal PB and the negative electrode terminal NB are connected to positive electrode ends and negative electrode ends of the plurality of battery modules connected in series in the battery case.

The first motor 12 generates a rotation driving force (a power-run operation) using electric power supplied from the battery 11. The second motor 13 generates the generated electric power using a rotation driving force input to a rotary shaft. Here, rotation power of the internal combustion engine ENG (see FIG. 7) is transmittable to the second motor 13. For example, each of the first motor 12 and the second motor 13 is a 3-phase alternating current brushless DC motor. 3 phases are a U phase, a V phase and a W phase. Each of the first motor 12 and the second motor 13 is an inner rotor type. As shown in FIG. 1, the first motor 12 includes a rotor 12A having a permanent magnet 12A1 for a field system, and a stator 12B having a 3-phase stator winding configured to generate a rotating magnetic field that rotates the rotor 12A. Similarly, the second motor 13 includes a rotor having a permanent magnet for a field system, and a stator having a 3-phase stator winding configured to generate a rotating magnetic field that rotates the rotor. The 3-phase stator winding of the first motor 12 is connected to a first 3-phase connector 1b of the power conversion device 1. The 3-phase stator winding of the second motor 13 is connected to a second phase connector 1c of the power conversion device 1.

The power conversion device 1 shown in FIG. 10 includes a power module 21, a reactor 22, a capacitor unit 23, a resistor 24, a first current sensor 25, a second current sensor 26 and a third current sensor 27. The power conversion device control system S includes an electronic control unit 28 (MOT GEN ECU) and a gate drive unit 29 (G/D VCU ECU) (the inverter control part 28A7 (see FIG. 2)).

The power module 21 includes a first electric power conversion circuit part 31, a second electric power conversion circuit part 32 and a third electric power conversion circuit part 33.

Output-side conductors (output bus bars) 51 of the first electric power conversion circuit part 31 are bundled to a 3-phase extent of a U phase, a V phase and a W phase and connected to the first 3-phase connector 1b. That is, the output-side conductors 51 of the first electric power conversion circuit part 31 are connected to a 3-phase stator winding of the first motor 12 via the first 3-phase connector 1b.

Positive electrode-side conductors (P bus bars) PI of the first electric power conversion circuit part 31 are bundled to a 3-phase extent of a U phase, a V phase and a W phase and connected to the positive electrode terminal PB of the battery 11.

Negative electrode-side conductors (N bus bars) NI of the first electric power conversion circuit part 31 are bundled to a 3-phase extent of a U phase, a V phase and a W phase and connected to the negative electrode terminal NB of the battery 11.

That is, the first electric power conversion circuit part 31 converts direct current electric power input from the battery 11 via the third electric power conversion circuit part 33 into 3-phase alternating current electric power.

Output-side conductors (output bus bars) 52 of the second electric power conversion circuit part 32 are bundled to a 3-phase extent of a U phase, a V phase and a W phase and connected to the second 3-phase connector 1c. That is, the output-side conductors 52 of the second electric power conversion circuit part 32 are connected to a 3-phase stator winding of the second motor 13 via the second 3-phase connector 1c.

The positive electrode-side conductors (the P bus bars) PI of the second electric power conversion circuit part 32 are bundled to a 3-phase extent of a U phase, a V phase and a W phase and connected to the positive electrode terminal PB of the battery 11 and the positive electrode-side conductors PI of the first electric power conversion circuit part 31.

The negative electrode-side conductors (the N bus bars) NI of the second electric power conversion circuit part 32 are bundled to a 3-phase extent of a U phase, a V phase and a W phase and connected to the negative electrode terminal NB of the battery 11 and the negative electrode-side conductors NI of the second electric power conversion circuit part 32.

The second electric power conversion circuit part 32 converts 3-phase alternating current electric power input from the second motor 13 into direct current electric power. The direct current electric power converted by the second electric power conversion circuit part 32 can be supplied to at least one of the battery 11 and the first electric power conversion circuit part 31.

In the example shown in FIG. 10, a U phase switching element UH, a V phase switching element VH and a W phase switching element WH of the first electric power conversion circuit part 31, and a U phase switching element UH, a V phase switching element VH and a W phase switching element WH of the second electric power conversion circuit part 32 are connected to the positive electrode-side conductors PI. The positive electrode-side conductors PI are connected to a positive electrode bus bar 50p of the capacitor unit 23.

A U phase switching element UL, a V phase switching element VL and a W phase switching element WL of the first electric power conversion circuit part 31, and a U phase switching element UL, a V phase switching element VL and a W phase switching element WL of the second electric power conversion circuit part 32 are connected to the negative electrode-side conductors NI. The negative electrode-side conductors NI are connected to a negative electrode bus bar 50n of the capacitor unit 23.

In the example shown in FIG. 10, a connecting point TI between the U phase switching element UH and the U phase switching element UL, a connecting point TI between the V phase switching element VH and the V phase switching element VL, and a connecting point TI between the W phase switching element WH and the W phase switching element WL of the first electric power conversion circuit part 31 are connected to the output-side conductors 51.

A connecting point TI between the U phase switching element UH and the U phase switching element UL, a connecting point TI between the V phase switching element VH and the V phase switching element VL, and a connecting point TI between W phase switching element WH and the W phase switching element WL of the second electric power conversion circuit part 32 are connected to the output-side conductors 52.

In the example shown in FIG. 10, the output-side conductors 51 of the first electric power conversion circuit part 31 are connected to a first input/output terminal Q1. The first input/output terminal Q1 is connected to the first 3-phase connector 1b. The connecting point TI of each phase of the first electric power conversion circuit part 31 is connected to the stator winding of each phase of the first motor 12 via the output-side conductors 51, the first input/output terminal Q1 and the first 3-phase connector 1b.

The output-side conductors 52 of the second electric power conversion circuit part 32 are connected to a second input/output terminal Q2. The second input/output terminal Q2 is connected to the second 3-phase connector 1c. The connecting point TI of each phase of the second electric power conversion circuit part 32 is connected to the stator winding of each phase of the second motor 13 via the output-side conductors 52, the second input/output terminal Q2 and the second 3-phase connector 1c.

In the example shown in FIG. 10, each of the switching elements UH, UL, VH, VL, WH and WL of the first electric power conversion circuit part 31 includes a flywheel diode.

Similarly, each of the switching elements UH, UL, VH, VL, WH and WL of the second electric power conversion circuit part 32 includes a flywheel diode.

In the example shown in FIG. 10, the gate drive unit 29 (the inverter control part 28A7 (see FIG. 2)) inputs a gate signal to each of the switching elements UH, UL, VH, VL, WH and WL of the first electric power conversion circuit part 31.

Similarly, the gate drive unit 29 inputs a gate signal to each of the switching elements UH, UL, VH, VL, WH and WL of the second electric power conversion circuit part 32.

The first electric power conversion circuit part 31 converts direct current electric power input from the battery 11 via the third electric power conversion circuit part 33 into 3-phase alternating current electric power, and supplies U phase current, V phase current and W phase current of alternating current to a 3-phase stator winding of the first motor 12. The second electric power conversion circuit part 32 converts 3-phase alternating current electric power output from the 3-phase stator winding of the second motor 13 into direct current electric power through ON (connection)/OFF (disconnection) driving of each of the switching elements UH, UL, VH, VL, WH and WL of the second electric power conversion circuit part 32 synchronized with rotation of the second motor 13.

The third electric power conversion circuit part 33 is a voltage control unit (VCU). The third electric power conversion circuit part 33 includes a high side switching element S1 and a low side switching element S2, which are one phase extent.

An electrode of the switching element S1 on a positive electrode side is connected to a positive electrode bus bar PV. The positive electrode bus bar PV is connected to the positive electrode bus bar 50p of the capacitor unit 23. An electrode of the switching element S2 on a negative electrode side is connected to a negative electrode bus bar NV. The negative electrode bus bar NV is connected to the negative electrode bus bar 50n of the capacitor unit 23. The negative electrode bus bar 50n of the capacitor unit 23 is connected to the negative electrode terminal NB of the battery 11. An electrode of the switching element S1 on a negative electrode side is connected to an electrode of the switching element S2 on a positive electrode side. The switching element S1 and the switching element S2 include flywheel diodes.

A bus bar 53 that constitutes a connecting point between the switching element S1 and the switching element S2 of the third electric power conversion circuit part 33 is connected to one end of the reactor 22. The other end of the reactor 22 is connected to the positive electrode terminal PB of the battery 11. The reactor 22 includes a coil, and a temperature sensor configured to detect a temperature of the coil. The temperature sensor is connected to the electronic control unit 28 by a signal line.

The third electric power conversion circuit part 33 switches ON (connection)/OFF (disconnection) between the switching element S1 and the switching element S2 on the basis of the gate signals input to the gate electrode of the switching element S1 and the gate electrode of the switching element S2 from the gate drive unit 29.

The third electric power conversion circuit part 33 alternately switches between a first state in which the switching element S2 is set to ON (connection) and the switching element S1 is set to OFF (disconnection) and a second state in which the switching element S2 is set to OFF (disconnection) and the switching element S1 is set to ON (connection) during boosting. In the first state, current flows to the positive electrode terminal PB of the battery 11, the reactor 22, the switching element S2, and the negative electrode terminal NB of the battery 11 in sequence, and the reactor 22 is excited by direct current and magnetic energy is accumulated. In the second state, an actuating voltage (an induction voltage) is generated between both ends of the reactor 22 such that a variation in magnetic flux due to disconnection of the current flowing to the reactor 22 is disturbed. The induction voltage due to the magnetic energy accumulated in the reactor 22 is superimposed on a battery voltage, and the boosted voltage higher than an inter-terminal voltage of the battery 11 is applied between the positive electrode bus bar PV and the negative electrode bus bar NV of the third electric power conversion circuit part 33.

The third electric power conversion circuit part 33 alternately switches between the second state and the first state during regeneration. In the second state, current flows to the positive electrode bus bar PV of the third electric power conversion circuit part 33, the switching element S1, the reactor 22, and the positive electrode terminal PB of the battery 11 in sequence, and the reactor 22 is excited by direct current and magnetic energy is accumulated. In the first state, an actuating voltage (an induction voltage) is generated between both ends of the reactor 22 such that a variation in magnetic flux due to disconnection of the current flowing to the reactor 22 is disturbed. The induction voltage due to the magnetic energy accumulated in the reactor 22 is dropped, and the dropped voltage lower than the voltage between the positive electrode bus bar PV and the negative electrode bus bar NV of the third electric power conversion circuit part 33 is applied between the positive electrode terminal PB and the negative electrode terminal NB of the battery 11.

The capacitor unit 23 includes a first smoothing capacitor 41, a second smoothing capacitor 42 and a noise filter 43.

The first smoothing capacitor 41 is connected between the positive electrode terminal PB and the negative electrode terminal NB of the battery 11. The first smoothing capacitor 41 smoothes voltage fluctuation generated according to a switching operation of ON/OFF of the switching element S1 and the switching element S2 during regeneration of the third electric power conversion circuit part 33.

The second smoothing capacitor 42 is connected between the positive electrode-side conductors PI and the negative electrode-side conductors NI of each of the first electric power conversion circuit part 31 and the second electric power conversion circuit part 32, and between the positive electrode bus bar PV and the negative electrode bus bar NV of the third electric power conversion circuit part 33. The second smoothing capacitor 42 is connected to the plurality of positive electrode-side conductors PI and the negative electrode-side conductors NI, and the positive electrode bus bar PV and the negative electrode bus bar NV via the positive electrode bus bar 50p and the negative electrode bus bar 50n. The second smoothing capacitor 42 smoothes voltage fluctuation generated according to a switching operation of ON/OFF of each of the switching elements UH, UL, VH, VL, WH and WL of the first electric power conversion circuit part 31 and the second electric power conversion circuit part 32. The second smoothing capacitor 42 smoothes voltage fluctuation generated according to a switching operation of ON/OFF of the switching element S1 and the switching element S2 during boosting of the third electric power conversion circuit part 33.

The noise filter 43 is connected between the positive electrode-side conductors PI and the negative electrode-side conductors NI of each of the first electric power conversion circuit part 31 and the second electric power conversion circuit part 32, and between the positive electrode bus bar PV and the negative electrode bus bar NV of the third electric power conversion circuit part 33. The noise filter 43 includes two capacitors that are connected in series. A connecting point of the two capacitors is connected to a body ground or the like of the vehicle 10.

The resistor 24 is connected between the positive electrode-side conductors PI and the negative electrode-side conductors NI of each of the first electric power conversion circuit part 31 and the second electric power conversion circuit part 32, and between the positive electrode bus bar PV and the negative electrode bus bar NV of the third electric power conversion circuit part 33.

The first current sensor 25 forms the connecting point TI of each phase of the first electric power conversion circuit part 31, is disposed on the output-side conductor 51 connected to the first input/output terminal Q1, and detects current of each of the U phase, the V phase and the W phase. The second current sensor 26 is disposed on the output-side conductor 52 connected to the second input/output terminal Q2 while forming the connecting point TI of each phase of the second electric power conversion circuit part 32, and detects current of each of the U phase, the V phase and the W phase. The third current sensor 27 is disposed on the bus bar 53 connected to the reactor 22 while forming the connecting point between the switching element S1 and the switching element S2, and detects current flowing to the reactor 22.

Each of the first current sensor 25, the second current sensor 26 and the third current sensor 27 is connected to the electronic control unit 28 by a signal line.

The electronic control unit 28 controls an operation of each of the first motor 12 and the second motor 13. For example, the electronic control unit 28 is a software function part that serves as a predetermined program is executed by a processor such as a central processing unit (CPU) or the like. The software function part is an electronic control unit (ECU) including a processor such as a CPU or the like, a read only memory (ROM) on which a program is stored, a random access memory (RAM) on which data are temporarily stored, and an electronic circuit such as a timer or the like. Further, at least a part of the electronic control unit 28 may be an integrated circuit such as large scale integration (LSI) or the like. For example, the electronic control unit 28 executes feedback control or the like of current using a current detection value of the first current sensor 25 and a current target value according to a torque command value with respect to the first motor 12, and generates a control signal input to the gate drive unit 29 (the inverter control part 28A7 (see FIG. 2)). For example, the electronic control unit 28 executes feedback control or the like of current using a current detection value of the second current sensor 26 and a current target value according to a regeneration command value with respect to the second motor 13, and generates a control signal input to the gate drive unit 29. The control signal is a signal indicating a timing when each of the switching elements UH, UL, VH, VL, WH and WL of the first electric power conversion circuit part 31 and the second electric power conversion circuit part 32 is driven to turn ON (connection)/OFF (disconnection). For example, the control signal is a pulse-width-modulated signal or the like.

The gate drive unit 29 (the inverter control part 28A7 (see FIG. 2)) generates a gate signal for actually driving ON (connection)/OFF (disconnection) of each of the switching elements UH, UL, VH, VL, WH and WL of the first electric power conversion circuit part 31 and the second electric power conversion circuit part 32 on the basis of a control signal received from the electronic control unit 28. For example, the gate drive unit 29 executes amplification, a level shift, and so on, of the control signal, and generates a gate signal.

The gate drive unit 29 generates a gate signal for driving ON (connection)/OFF (disconnection) of each of the switching element S1 and the switching element S2 of the third electric power conversion circuit part 33. For example, the gate drive unit 29 generates a gate signal of a duty ratio according to a boosted voltage command during boosting of the third electric power conversion circuit part 33 or a dropped voltage command during regeneration of the third electric power conversion circuit part 33. A duty ratio is a ratio between the switching element S1 and the switching element S2.

In the example shown in FIG. 10, while the power conversion device control system S of the first embodiment or the motor system MS of the second embodiment is applied to the vehicle 10, in another example, the power conversion device control system S of the first embodiment or the motor system MS of the second embodiment may also be applied to a machine other than the vehicle 10, for example, an elevator, a pump, a fan, a railway vehicle, an air conditioner, a refrigerator, a washing machine, or the like.

While preferred embodiments of the invention have been described and illustrated above, it should be understood that these are exemplary of the invention and are not to be considered as limiting. Additions, omissions, substitutions, and other modifications can be made without departing from the or scope of the present invention. Accordingly, the invention is not to be considered as being limited by the foregoing description, and is only limited by the scope of the appended claims.

What is claimed is:

1. A power conversion device control system comprising:
a power conversion device configured to supply electric power to a rotary electric machine; and
a control device configured to control the power conversion device based on a pulse width modulation control,
wherein the control device
controls the power conversion device through synchronous control in which a carrier frequency of the power conversion device in the pulse width modulation control is proportional to a rotational speed of the rotary electric machine when a temperature of a permanent magnet provided in the rotary electric machine is higher than a predetermined threshold value, and
controls the power conversion device through non-synchronous control in which a carrier frequency of the power conversion device in the pulse width modulation control is not proportional to a rotational speed of the rotary electric machine when a temperature of the permanent magnet is the predetermined threshold value or less.

2. A motor system comprising:
the power conversion device control system according to claim 1, a traveling/driving motor serving as the rotary electric machine, and a generating motor,
wherein the control device controls the power conversion device configured to supply electric power to the traveling/driving motor through the synchronous control and the non-synchronous control.

3. A composite system comprising:
the power conversion device control system and the rotary electric machine according to claim 1, and an internal combustion engine,
wherein, when the internal combustion engine is operating and even when a temperature of the permanent magnet is the predetermined threshold value or less, the control device allows control of the power conversion device through the synchronous control.

4. A composite system comprising:
the power conversion device control system and the rotary electric machine according to claim 1, and an internal combustion engine,
wherein, when a rotational speed of the internal combustion engine is a predetermined rotational speed or more and even when a temperature of the permanent magnet is the predetermined threshold value or less, the control device allows control of the power conversion device through the synchronous control.

5. The power conversion device control system according to claim 1, wherein the power conversion device control system is mounted on a vehicle,
- the rotary electric machine is used for driving and traveling of the vehicle, and
- when a traveling speed of the vehicle is a predetermined speed or more and even when a temperature of the permanent magnet is the predetermined threshold value or less, the control device allows control of the power conversion device through the synchronous control.

6. A composite system comprising:
- the power conversion device control system and the rotary electric machine according to claim 1, and an internal combustion engine,
- wherein, when the temperature of the permanent magnet is higher than a protection threshold value which is a temperature higher than the predetermined threshold value, the power conversion device restricts output of the rotary electric machine.

* * * * *